United States Patent [19]

Maxemchuk

[11] 4,313,197
[45] Jan. 26, 1982

[54] SPREAD SPECTRUM ARRANGEMENT FOR (DE)MULTIPLEXING SPEECH SIGNALS AND NONSPEECH SIGNALS

[75] Inventor: Nicholas F. Maxemchuk, Mountainside, N.J.

[73] Assignee: Bell Telephone Laboratories, Incorporated, Murray Hill, N.J.

[21] Appl. No.: 138,721

[22] Filed: Apr. 9, 1980

[51] Int. Cl.³ .............................................. H04J 3/02
[52] U.S. Cl. ..................................... 370/111; 370/23; 375/1
[58] Field of Search ...................... 370/19, 23, 93, 108, 370/111; 375/1, 34, 50

[56] References Cited

U.S. PATENT DOCUMENTS

| | | |
|---|---|---|
| 1,895,461 | 1/1933 | Heising . |
| 3,304,372 | 2/1967 | Filipowsky . |
| 3,311,704 | 3/1967 | Filipowsky . |
| 3,406,344 | 10/1968 | Hopper . |
| 3,492,429 | 1/1970 | Schroeder . |
| 3,984,626 | 10/1976 | Mounts ................................. 370/19 |
| 4,221,934 | 9/1980 | Schiff ..................................... 370/23 |

OTHER PUBLICATIONS

"A Guided Tour of the Fast Fourier Transform", by G. D. Bergland, IEEE Spectrum, vol. 6, No. 7, Jul. 1969, pp. 41–52.
Spread Spectrum Systems, Chapter I, by R. C. Dixon, New York: John Wiley & Sons, 1976, pp. xi–xv, 1–12.

*Primary Examiner*—Jin F. Ng
*Assistant Examiner*—Tommy P. Chin
*Attorney, Agent, or Firm*—Richard J. Roddy

[57] ABSTRACT

It is known to multiplex speech signals and nonspeech signals over a common communication path. One arrangement uses a portion of the frequency spectrum of the path for speech signals with the remainder for nonspeech signals. Another inserts data signals during gaps in the speech signals. Still another treats a speech signal as a carrier signal and modulates the speech signal with data signals. Unfortunately, users of such known arrangements experience excessive distortion or perceive others as encroaching on the path. These and other problems are mitigated by my improved signal processor (100, 200) for the spread spectrum (de)multiplexing of speech signals and nonspeech signals. In an illustrative embodiment, at a transmitter, a block (110) of speech signals may be converted (140) from a time domain to a frequency domain by a Fourier transformation. A Fourier component may be pseudo-randomly selected (130) from a subset of such components. Responsive to the selected component, a prediction (160) of the component may be substituted therefor, the prediction being thereafter modified (170), e.g., by its amplitude being incremented or decremented to reflect the multiplexing of a logic 1 or a logic 0 nonspeech signal. The modified prediction may be converted (150) back to the time domain for transmission to a receiver. At the receiver, a parallel demultiplexing (200) occurs for extracting (270) speech signals and nonspeech signals from the multiplexed signals.

8 Claims, 2 Drawing Figures

SPREAD SPECTRUM ARRANGEMENT FOR (DE)MULTIPLEXING SPEECH SIGNALS AND NONSPEECH SIGNALS

TECHNICAL FIELD

This invention relates to (de)multiplexing and, more particularly, to a spread spectrum arrangement for multiplexing and demultiplexing speech signals and nonspeech signals.

BACKGROUND OF THE INVENTION

One arrangement for multiplexing speech signals and nonspeech signals includes apparatus for transmitting speech signals in one portion of the frequency spectrum of a communication path linking a transmitter and a receiver with the remainder of the bandwidth for transmitting nonspeech signals.

Another; disclosed in U.S. Pat. No. 3,304,372, issued Feb. 14, 1967 and entitled "Voice-Data Multiplexing System for Transmitting Data During Pauses in the Voice Signals"; includes an arrangement for detecting intervals of no speech on the communication path and for inserting a data signal therein. More specifically, at the transmitter, a decision circuit continually monitors an input line. On the one hand, when speech signals are detected on the line, the decision circuit provides a first gating signal to allow passage of the speech signals through a voice gate onto the communication path. On the other hand, when a gap in the speech signals is detected and the gap exceeds a predetermined minimum time duration, the decision circuit provides a second gating signal to allow passage of data signals through a data gate onto the communication path. Between gaps of no speech, data signals are queued for transmission. At the receiver, a first detector monitors signals on the communication path for the appearance of a unique signal which heralds the arrival of speech signals. Also, a second detector monitors signals on the communication path for the appearance of another condition which heralds the arrival of data signals. Thereby the arrangement multiplexes data signals during gaps in voice signals.

Still another; disclosed in U.S. Pat. No. 3,406,344, issued Oct. 15, 1968 and entitled "Transmission of Low Frequency Signals by Modulation of Voice Carrier"; includes an arrangement wherein speech signals are modulated by low frequency data signals. The modulated speech signals, the speech signals being the carrier signals, are transmitted over the communication path to the receiver. At the receiver, an envelope detector may be used to recover the data signals from the modulated speech signals. Also, the speech signals may be readily reproduced.

Unfortunately, users of known arrangements for (de)multiplexing speech signals and nonspeech signals experience excessive distortion or perceive others as encroaching on the communication path.

SUMMARY OF THE INVENTION

These and other problems are mitigated by my improved signal processor for the spread spectrum (de)multiplexing of speech signals and nonspeech signals. According to one aspect of my invention, at a transmitter, a speech signal representation may be converted from a first domain to a second domain. Responsive to a selected component of the second domain representation, a prediction of the component may be substituted for the component and the prediction may be modified for multiplexing nonspeech signals. The modified prediction may be converted from the second domain to the first domain for extension to a receiver. According to another aspect of my invention, at a receiver, the multiplexed signal may be converted from the first domain to the second domain. The component selected at the transmitter may again be selected at the receiver and extended as an input to a second predictor. Responsive to the selected component and to a prediction thereof, the speech signal and the nonspeech signal may be respectively extracted for extension to respective output terminals.

BRIEF DESCRIPTION OF THE DRAWING

My invention should become more apparent from the following detailed description and taken in conjunction with the accompanying drawing in which.

DETAILED DESCRIPTION

Figure 1:
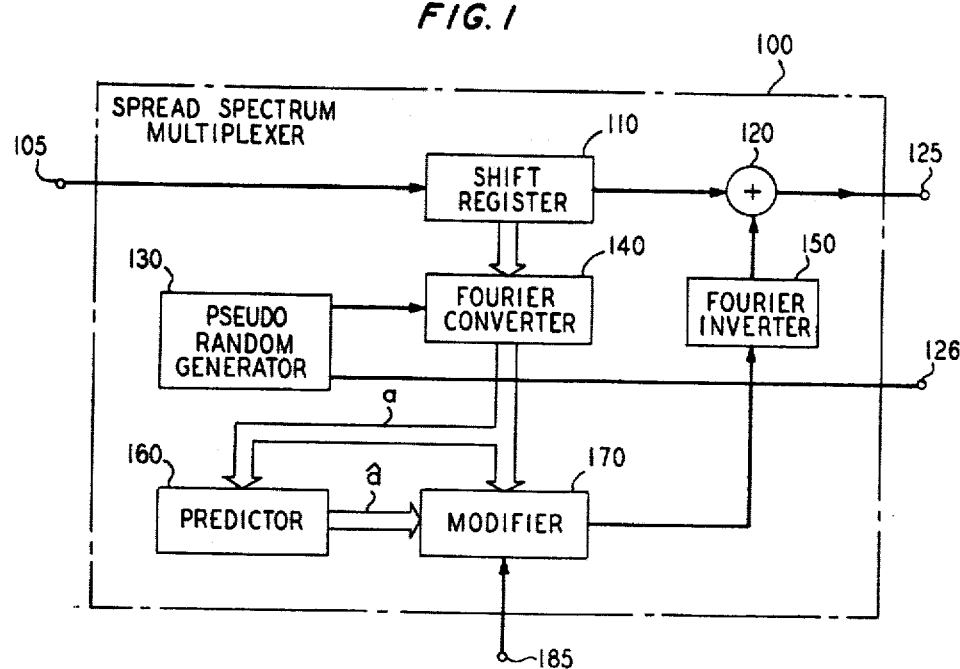
FIG. 1 is a schematic block diagram of an illustrative spread spectrum multiplexer constructed in accordance with the principles of my invention.

Broadly, referring to the schematic in FIG. 1, at a transmitter, an analog speech signal may be extended through an analog-to-analog converter (not shown), may be processed by signal processor 100 for spread spectrum multiplexing a nonspeech signal therewith, and may be transmitted through a digital-to-analog converter (not shown) over a standard communication path, such as an unconditioned telephone line, to a receiver. Regarding spread spectrum systems, see, for example, R. C. Dixon, *Spread Spectrum Systems,* New York: John Wiley & Sons, 1976, pp. 1-12.

Figure 2:
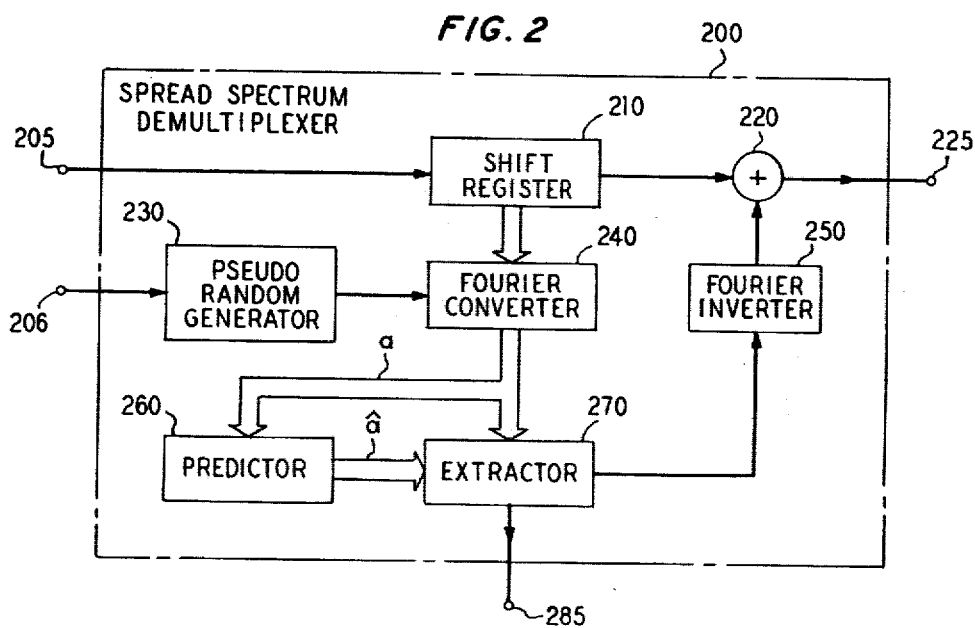
FIG. 2 is a schematic block diagram of an illustrative spread spectrum demultiplexer constructed in accordance with the principles of my invention.

Referring to the schematic in FIG. 2, at the receiver, the received multiplexed analog signal may be extended through an analog-to-digital converter (not shown) and may be processed by signal processor 200 for spread spectrum demultiplexing the received signal by extracting the speech signal and the nonspeech signal therefrom. The extracted speech signal may be extended through a digital-to-analog converter (not shown) as an analog speech signal while the extracted nonspeech signal may be extended to a first output terminal 285.

More particularly, referring to FIG. 1, at the transmitter, an input signal, which may be an analog speech signal that has been quantized to a digital representation by the analog-to-digital converter (not shown), is extended from input terminal 105 of multiplexer 100 to an input of shift register 110. Shift register 110 is for sequentially delaying a block of N such input signals. The block of N delayed signals, or samples, may be extended jointly to a first input of adder 120 and to an input of converter 140. As to converter 140, it is well known that a signal can be described either in the time domain or in the frequency domain and that transforms, or mathematical operators, are available for converting a descriptive function of a signal from one domain to the other and for inverting the conversion. Some well known transforms include the Walsh transform and the Fourier transform. Hence, illustrative converter 140 may be for converting a time domain input signal to a frequency domain signal by way of a Fourier transformation. Regarding Fourier transforms, see, for example, G. D. Bergland, "A Guided Tour of the Fast Fourier Transform," *IEEE Spectrum*, Vol. 6, No. 7, (July 1969), pp. 41–52 and the references cited therein. A typical discrete Fourier transform of a time domain function is a frequency domain function including a summation of a plurality of components, each component including (1) a coefficient multiplied by (2) to complex function, the complex function being convertable to a sinusoidal function with a sine term and a cosine term, each term having a determinable harmonic frequency. For example, the discrete Fourier transformation X(j) of a sampled time domain signal x(k) can be written as:

$$X(j) = \frac{1}{N} \sum_{k=0}^{N-1} x(k) e^{-\frac{i 2\pi jk}{N}} \quad (1)$$

where e is the natural logarithmic base, $i = \sqrt{-1}$ and $j = 0, 1, \ldots, N-1$. Conversely, the inverse Fourier transformation x(k) of a frequency domain signal X(j) can be written as:

$$x(k) = \sum_{j=0}^{N-1} X(j) e^{\frac{i 2\pi jk}{N}} \quad (2)$$

where $k = 0, 1, \ldots, N-1$.

Continuing as to FIG. 1, responsive to a selecting signal from generator 130, one of the Fourier components is selected for mitigating distortion effects. Illustratively, generator 130 is a pseudo-random generator for pseudo-randomly selecting a component whereby distortion effects may be mitigated by being spread over the frequency spectrum. The selected component is extended from an output of converter 140 to an input of predictor 160. Responsive to the selected component, predictor 160 for predicting its input selected component extends a prediction thereof to a first input of modifier 170. A second input of modifier 170 is extended from input terminal 185 as the nonspeech signal to be multiplexed with the speech signal. Firstly, modifier 170 substitutes the prediction in place of the selected component. Secondly, responsive to the nonspeech signal, modifier 170 modifies the prediction for multiplexing the nonspeech signal. The modified prediction signal is extended from an output of modifier 170 to an input of inverter 150 for converting the frequency domain signal to a time domain signal by way of an inverse Fourier transformation and thence to a second input of adder 120. The multiplexed signal output of adder 120 is thereafter extended to output terminal 125 for extension through the digital-to-analog converter (not shown) over the communication path to the receiver.

Referring to FIG. 2, at the receiver, the received multiplexed analog signal is quantized to a digital representation by the analog-to-digital converter (not shown) and is then extended from input terminal 205 of demultiplexer 200 to an input of shift register 210. Shift register 210 is for sequentially delaying a block of N such multiplexed signals. The block of N delayed samples may be extended jointly to a first input of adder 220 and to an input of converter 240 for converting a time domain signal to a frequency domain signal by way of a Fourier transformation. Responsive to a selecting signal from pseudo-random generator 230, one of the Fourier components is pseudo-randomly selected. Pseudo-random generator 230 may be synchronized with pseudo-random generator 130 for selecting the same Fourier component at the receiver as was selected at the transmitter.

The synchronization may occur by timing signals being exchanged between pseudo-random generators 130 and 230 over a time path interconnecting terminals 126 and 206. The selected component is extended from an output of converter 240 jointly to an input of predictor 260 and to a first input of extractor 270. Responsive to the selected component, predictor 260 for predicting the component selected at the transmitter extends a prediction thereof to a second input of extractor 270. Responsive to the selected component and to the prediction, extractor 270 extracts the nonspeech signal from the multiplexed signal and extends the nonspeech signal to first output terminal 285. Also, extractor 270, substitutes the prediction in place of the receiver selected component. In so doing, inasmuch as the prediction is a prediction of the component selected at the transmitter and represents that component before the aforedescribed modifier procedure, distortion effects are further mitigated. Finally, the prediction is extended through inverter 250 for converting the frequency domain signal to a time domain signal by way of an inverse Fourier transformation and thence to a second input of adder 220. The speech signal output of adder 220 is thereafter extended to a second output terminal 225.

Still, more particularly, at the transmitter, one common analog-to-digital converter samples an analog signal on a telephone line at a Nyquist rate of about 8000 samples per second for quantizing the signal according to a $\mu = 255$ companding law. Such converters are common in the Bell System T1 carrier system. A digital signal output of the converter is usually an eight bit digital sample representation of the analog signal. Here, the digital representation is extended to an input of shift register 110 for sequentially delaying a block of N such samples.

As to a block size N, for a typical unconditioned telephone line having a bandwidth of about 4000 hertz, experimentation has indicated that the number of Fourier components, and hence N, useful for transmission of a nonspeech signal increases as the block size increases through a block size of (N=) 32 samples. Hence, for my illustrative embodiment, shift register 110 is for delaying 32 eight bit digital samples.

As to pseudo-random generator 130, it is well known that the Fourier transformation of a time domain function is convertable to a sinusoidal function. Accordingly, the Fourier transform complex function of equation (1) is typically convertable for representation as the summation of a trigonometric sine term and a cosine term, each term being multiplied by a Fourier coefficient. For a block size of (N=) 32 samples and for the typical 4000 hertz telephone line when sampled at a Nyquist rate of 8000 samples per second, the harmonic frequencies of the sinusoidal function are multiples of 250 hertz. Experimentation has indicated that a subset of the harmonic frequencies, the subset including the seven frequencies in the band from 1000 hertz to 2500 hertz at increments of 250 hertz, obtains a relatively small amount of inter-component interference and a relatively high signal-to-noise ratio on an unconditioned telephone line. Accordingly, pseudo-random generator 130 extends a selecting signal for pseudo-randomly selecting a Fourier component having one of the seven mentioned frequencies. Also, to mitigate a diverging error in the prediction signal, a Fourier component selected for one block is not selected for the next succeeding block.

As to predictor 160, the selected Fourier component is extended from an output of converter 140 to an input of predictor 160. Experimentation has indicated that, inasmuch as the Nyquist sampling rate is relatively fast, there is usually little deviation from a sample in one block of samples to a corresponding sample in a next succeeding block of samples. Hence, in my illustrative embodiment, although other prediction signals may be used, responsive to the selected Fourier component, predictor 160 extends as a prediction signal the corresponding Fourier coefficient of the immediately prior block of samples. Specifically, the coefficient prediction signal is extended to the first input of modifier 170.

As to modifier 170, as aforedescribed, modifier 170 firstly substitutes the prediction, here the corresponding Fourier coefficient from the immediately prior block, in place of the selected coefficient. Of course, such a substitution may introduce some distortion. However, an in accord with the principles of my invention, the relatively rapid sampling rate coupled with the predictability of a speech signal mitigate the substitutional distortion effects. Secondly, the amplitude of the substituted prediction signal may be modified for multiplexing the nonspeech signal detected at terminal 185. For example, on the one hand and according to a first strategy, in the event the prediction signal exceeds a first prefixed threshold, modifier 170 may modify, for example, by increasing the amplitude of the prediction signal a first predetermined increment responsive to a logic 1 nonspeech signal detected at terminal 185. Conversely, according to a second strategy, modifier 170 may decrease the prediction signal a second predetermined increment responsive to a logic 0 nonspeech signal. On the other hand, in the event the prediction signal does not exceed the first threshold, the prediction signal may be replaced by a second threshold, which second threshold may thereafter be increased or decreased the first strategy or the second strategy predetermined increment, respectively, as aforesaid. Of course, such amplitude modification may introduce some distortion. However, and in accord with the principles of my invention, the amplitudinal distortion effects are spread over the frequency spectrum for mitigating their effects. As a result, the amplitudinal distortion effects may be perceived by a listener as uncorrelated noise. Thereby a pseudo-randomly selected component is advantageously modified for multiplexing a nonspeech signal. And, as aforementioned, the thus modified component is extended through inverter 150 to a second input of adder 120. Thereby a spread spectrum arrangement for multiplexing speech signals and nonspeech signals obtains with my illustrative embodiment.

At the receiver, shift register 210, adder 220, pseudo-random generator 230, converter 240, inverter 250, and predictor 260 are substantially similar to their respective counterparts at the transmitter. Further as to predictor 260, inasmuch as the prediction signal is the Fourier coefficient of the immediately prior block of samples and inasmuch as there is usually little deviation from one block to a next succeeding block, the aforedescribed amplitudinal distortion effects are further mitigated.

As to extractor 270, the receiver selected Fourier component is theoretically equal to the transmitted Fourier component. However, for well known reasons, e.g., phase distortion on the telephone line, the component selected at the receiver may be slightly different in magnitude than the transmitted component. Notwithstanding, responsive to the selected Fourier component, predictor 260 extends the prediction signal to the second input of extractor 270. On the one hand, in the event the prediction signal exceeds the aforementioned first threshold, extractor 270 may decrease the amplitude of the selected Fourier coefficient by an increment equal to the prediction signal. On the other hand, in the event the prediction signal does not exceed the aforesaid first threshold, extractor 270 may decrease the amplitude of the selected Fourier coefficient by an increment equal to the aforesaid second threshold. In either case, the remainder after the decreasing corresponds to the nonspeech signal. That is, a positive remainder implies a logic 1 nonspeech signal while a negative remainder implies a logic 0 nonspeech signal. Thereafter, the thus extracted nonspeech signal may be extended to output terminal 285 while the prediction signal may be extended through inverter 250 to the second input of adder 220.

Although various aspects of my invention have been described and illustrated in detail, it is to be understood that the same is not by way of limitation. For example, in my illustrative embodiment, inasmuch as the sampling rate is about 8000 samples per second and inasmuch as one nonspeech data bit is multiplexed for one block of (N=) 32 speech samples, the nonspeech signals may be multiplexed at a rate of up to (8000/32=) 250 bits per second. Clearly, other block sizes, numbers of bits multiplexed per block, and sampling rates can readily give rise to other rates for multiplexing nonspeech signals with speech signals in accord with the principles of my invention. Thus the spirit and scope of my invention is limited only by the terms of the appended claims.

I claim:

1. A signal processor including a first input terminal (105) adapted to receive a speech signal, a second input terminal (185) adapted to receive a nonspeech signal, means for multiplexing said speech signal and said nonspeech signal, means for extending said multiplexed signal to an output terminal (125), said output terminal adapted for transmitting said multiplexed signal to a receiver and characterized in that said multiplexing means includes spread spectrum means (100) for multiplexing said speech signal and said nonspeech signal, said spread spectrum multiplexing means including means (110) for delaying said speech signal, means (140) for converting said speech signal from a first domain to a second domain, said second domain signal having a plurality of components, means (130) for selecting one of said components, means (160) responsive to said selected component for providing a prediction of said selected component, means (170) responsive to said nonspeech signal for modifying said prediction, means (150) for converting said modified prediction from said second domain to said first domain, and means (120) for extending said delayed speech signal and said modified first domain signal to said output terminal.

2. The signal processor defined according to claim 1 wherein said component selecting means comprises means for selecting said component from a subset of the total number of second domain signal components, said subset being determined for mitigating inter-component interference as well as for increasing signal-to-noise ratio.

3. The signal processor defined according to claim 1 wherein said prediction providing means comprises means for extending a component from a prior block of second domain signals as said prediction, said component corresponding to said selected component.

4. A signal processor defined according to claim 1 wherein said prediction modifying means comprises means responsive to a first state of said nonspeech signal for altering said prediction according to a first strategy and means responsive to a second state of said nonspeech signal for altering said prediction according to a second strategy.

5. A signal processor including a first input terminal (205) adapted to receive a multiplexed signal, means for demultiplexing said multiplexed signal, means for extending a nonspeech signal from said multiplexed signal to a first output terminal (285), means for extending a speech signal from said multiplexed signal to a second output terminal (225) and characterized in that said demultiplexing means includes spread spectrum means (200) for demultiplexing said multiplexed signal and for extracting a speech signal and a nonspeech signal from said multiplexed signal, said spread spectrum demultiplexing means including, means (210) for delaying said multiplexed signal, means (240) for converting said multiplexed signal from a first domain to a second domain, said second domain signal having a plurality of components, means (230) for selecting one of said components, means (260) responsive to said selected component for providing a prediction of said selected component, means (270) responsive to said selected component and to said prediction for extracting said speech signal and said nonspeech signal, means (250) for converting said extracted speech signal from said second domain to said first domain, and means (220) for extending said delayed multiplexed signal and said extracted first domain speech signal to said second output terminal, and means for extending said extracted nonspeech second domain signal to said first output terminal.

6. The signal processor defined according to claim 5 wherein said component selecting means comprises means for selecting said component from a subset of the total number of second domain signal components, said subset being determined for mitigating inter-component interference as well as for increasing signal-to-noise ratio.

7. The signal processor defined according to claim 5 wherein said prediction providing means comprises means for extending a component from a prior block of second domain signals as said prediction, said component corresponding to said selected component.

8. A signal processor defined according to claim 5 wherein said prediction modifying means comprises means responsive to a first state of said nonspeech signal for altering said prediction according to a first strategy and means responsive to a second state of said nonspeech signal for altering said prediction according to a second strategy.

* * * * *